Patented May 29, 1951

2,555,167

UNITED STATES PATENT OFFICE 2,555,167

STABILIZED COMPOSITIONS CONTAINING HIGH MOLECULAR WEIGHT HALOGENATED MATERIALS

Christiaan Pieter van Dijk and Heino Tonnis Voorthuis, Amsterdam, Netherlands, assignors to Shell Development Company, San Francisco, Calif., a corporation of Delaware No Drawing. Application July 30, 1949, Serial No. 107,828. In the Netherlands August 11, 1948

9 Claims. (Cl. 260—45.9)

This invention relates to stabilization of high molecular weight halogenated organic material against deteriorating effects of heat and light by incorporation therewith of a combination of substances. In particular, the invention is concerned with stabilization of polymers of vinyl chloride.

In broad aspect, the invention is a composition of matter comprising essentially a halogen-containing substance having a molecular weight above 2000 in admixture with a stabilizing amount of an alkaline substance and a compound represented by the formula

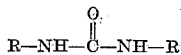

wherein R is a member of the group consisting of hydrogen and phenyl radicals containing nuclear-substituted sulfur-free polar groups, at least one R being said substituted phenyl radical.

It has been heretofore proposed to stabilize polymers of vinyl chloride with a combination of sodium carbonate and diphenyl urea or thiourea. However, diphenyl urea lacks sufficient compatibility with halogen-containing organic materials of high molecular weight to enable effective use thereof as stabilizer. Upon incorporation of as little as 0.1% of diphenyl urea with polyvinyl chloride, incompatibility is encountered and manifested by appearance of white spots in the resin composition. Such manifestation of incompatibility prevents the composition from having utility and is especially disadvantageous because 0.1% diphenyl urea is considerably below the proportion which is optimum for stabilizing effects.

The aryl thioureas such as diphenyl thiourea are likewise unsuitable for use as stabilizer of high molecular weight halogen-containing organic materials, though for a different reason. The thioureas contain sulfur with the result that they cause darkening of the resin compositions containing them, especially when lead compounds, which are often used as pigments, are contained therein. Consequently, the aryl thioureas tend to defeat the very purpose for which they might be utilized.

We have now discovered that the unsuitableness of urea derivatives as stabilizers can be overcome by employing a special class thereof. It was found that by having a polar group present as nuclear substituent in a phenyl urea or diphenyl urea, the compound not only retained its stabilizing effect, but also it was compatible with the halogen-containing material desired to be stabilized. The compound employed is a derivative of urea, not thiourea, and moreover, the compatibilizing nuclear substituent is a sulfur-free polar group thereby obviating all unsuitableness resulting from the presence of sulfur.

In order to obtain the fullest stabilizing benefit from the mono- or diphenyl urea containing a sulfur-free polar nuclear substituent, we employ it in combination with an alkaline substance. Although it has been found that an alkali metal carbonate, particularly sodium or potassium carbonate, is especially suitable as the alkaline substance, any other basic-acting substance may be used for this purpose. These include bicarbonates and hydroxides of alkali metals like sodium, potassium and lithium or alkaline earth metals like calcium and magnesium as well as magnesium oxide, basic phosphates such as di- or trisodium phosphate, basic salts of weak organic acids like sodium acetate and sodium phenoxide, organic amines such as diethyl amine, benzyl amine, aniline, phenylene diamine and ethylene diamine.

The high molecular weight halogen-containing material which is the principal constituent of the composition may be any substance containing an appreciable proportion of halogen and a molecular weight of at least 2000. No particular upper limit to the molecular weight is necessary to realize the advantages of the invention so long as it is above 2000. The stabilization is obtained with the halogen-containing organic materials having molecular weights of about 50,000, 100,000, 150,000 or higher. While it is preferred to employ the principle of the invention for the purpose of stabilizing chlorine-containing organic materials, substances containing other halogens such as bromine, fluorine or iodine are also suitable. In general, the halogen atom or atoms are linked directly to a carbon atom which in turn is linked to no other atoms than carbon, hydrogen or other halogen atoms which may be the same or different from the first. Among the materials stabilized are polyvinyl chloride, after-chlorinated polyvinyl chloride, copolymers of vinyl chloride with various polymerizable compounds containing olefinic double bonds such as vinyl acetate, vinyl chloride, acrylonitrile, maleic anhydride, styrene, etc.; halogenated polyolefins such as chlorinated polyethylene, brominated polyisobutylene, etc.; polymers of chloroprene as well as copolymers thereof with other polymerizable unsaturated compounds such as those named above; halogenated products of fats, train oils, waxes, and the high-boiling hydrocarbons and the like. In general, the stabilizing influence is particularly suitable with substances containing at least 10% halogen, particularly those with up to 75% halogen. Excellent results are obtainable upon stabilizing polyvinyl chloride as well as copolymers of vinyl chloride with up to 15% vinyl acetate.

EXAMPLE I

Excellent stabilizing results have been obtained with the carbamide, para-ethoxyphenyl urea (dulcine), as well as with the related compound N,N'-bis-(para-ethoxyphenyl) urea. This will be evident from the results given in the following table. Compositions were prepared from polyvinyl chloride having a molecular weight of about 100,000 which contained 40% dioctyl phthalate as plasticizer. The composition also contained 0.15% soda and the proportion of the urea derivatives indicated in the table. The compositions were rolled into sheets of 1.2 mm. thickness and then exposed to contact with circulating air at 160° C. for the stated times whereupon the color values given in the table were determined with a Lovibond tintometer. In no case was there manifestation of incompatibility in the compositions.

Table I

| Exposure Time, in Minutes | 4-Ethoxyphenyl carbamide | | | N,N'-bis(4-ethoxyphenyl) urea | | |
|---|---|---|---|---|---|---|
| | 0.05% | 0.45% | 1% | 0.05% | 0.45% | 1% |
| 15 | 2.4 | 1.8 | 3.3 | 2.4 | 2.0 | 4.6 |
| 30 | 3.5 | 2.0 | 3.9 | 3.7 | 2.4 | 5.0 |
| 45 | 5.0 | 2.7 | 5.0 | 4.7 | 3.5 | 6.0 |
| 60 | 6.8 | 4.2 | 6.8 | 7.9 | 5.1 | 8.1 |
| 90 | 30 | 5.3 | 30 | 10 | 6.0 | 30 |
| 105 | | 7.6 | | 30 | 6.7 | |
| 120 | | 30 | | | 30 | |

In like manner, excellent results were obtained with a compound wherein the polar substituent group was a nitrogroup, namely, meta-nitrophenyl urea. Other compounds of the class with which satisfactory results were obtained in every respect were N,N'di (4-chlorophenyl) urea, para-acetyl-phenyl urea, ortho-chlorophenyl) urea, para-carbethoxyphenyl urea, ortho, para-dinitrophenyl urea, and para-diethylaminophenyl urea.

EXAMPLE II

In order to demonstrate the superiority of the stabilizers, which, according to the invention, carry polar groups but are exempt of sulphur, in comparison with known stabilizers such as thiourea derivatives, 5 mixtures were prepared of the following compositions:

Mixtures a, b, c, and d were each composed of 100 parts polyvinyl chloride, 60 parts dioctyl phthalate, 0.15 part sodium carbonate, 2 parts white lead and 0.15 part stabilizer. The stabilizers used were in mixture a p-chlorophenyl urea, in mixture b N,N'-di (p-chlorophenyl) urea, in mixture c N,N'-di (p-chlorophenyl thiourea and in mixture d N,N'-di (ortho-chlorophenyl) thiourea. Mixture e did not contain any stabilizer, but for that matter had the same composition as the other 4 mixtures. The 5 mixtures were rolled into sheets at a temperature of 160° C. The following results were obtained:

Table II

| Plasticizer | Time of rolling | Color |
|---|---|---|
| | Minutes | |
| p-Chlorophenyl urea | 60 | white. |
| N,N'-di (p-chlorophenyl) urea | 60 | Do. |
| N,N'-di (p-chlorophenyl) thiourea | | dark brown. |
| N,N'-di (p-chlorophenyl) thiourea | | Do. |
| None | 30 | reddish. |

Apparently the presence of sulphur in the molecule of the stabilizer has an adverse effect on the stabilizing properties thereof, in that the sheets became immediately dark brown. The corresponding derivatives of the invention, however, gave very satisfactory results.

EXAMPLE III

To further illustrate the remarkable advantages which are obtained in using the new stabilizers of the present invention, mixtures were prepared as in Example II except in that no lead pigment and 0.3 part stabilizer instead of 0.15 part stabilizer were used. The mixtures were worked into sheets of 1.2 mm. thickness by rolling at 160° C. during 3 minutes. The sheets thus prepared were subsequently subjected to a heat treatment at 160° C. under pressure in a closed matrix, for the times stated in the table below. The color values given in this table were determined with a Lovibond tintometer. In none of the cases was there any manifestation of incompatability in the compositions.

Table III

| Stabilizer | Color after a stay in the matrix of— | | | |
|---|---|---|---|---|
| | 15 min. | 30 min. | 45 min. | 60 min. |
| None | 4.0 | 15 | over 20 | |
| p-acetylphenyl urea | 2.4 | 2.4 | 2.7 | 3.3 |
| p-carbethoxyphenyl urea | 2.7 | 3.2 | 3.9 | 4.7 |
| p-chlorophenyl urea | 2.2 | 2.5 | 3.0 | 3.5 |
| N,N'-di(p-chlorophenyl) urea | 3.0 | 4.5 | 7.0 | 8.5 |
| m-nitrophenyl urea | 4.2 | 5.5 | 5.9 | 6.3 |
| o,p-dinitrophenyl urea | 6.2 | 9.2 | 13 | 15 |
| p-diethylaminophenyl urea | 4.0 | 4.8 | 7.5 | 8.9 |

The organic stabilizing compound is a substituted urea wherein one to two of the amido groups of urea has a single hydrogen atom thereon replaced by a substituted phenyl radical, the phenyl substituent being a member of the class consisting of the polar radicals represented by the formulas RO—, $NO_2$—, $H_2N$—, halogen, RHN—, $R_2N$—, ROOC—, and RCO—, wherein R is a hydrocarbon radical (preferably of up to 10 carbon atoms) such as an alkyl, alkenyl, aryl or aralkyl group like a methyl, ethyl, isopropyl, hexyl, decyl, allyl, crotyl, phenyl, tolyl or benzyl radical. Particularly suitable compounds are those wherein the substituent linked to the phenyl group is a lower alkoxy radical of 1 to 5 carbon atoms as is the case with 4-methoxyphenyl carbamide; 4,4' - dimethoxy carbanilide; 4 - ethoxyphenyl carbamide; 4,4' - diethoxy carbanilide; 4 - propyloxphenyl carbamide; 4,4'-dipropyloxy carbanilide; 4-isobutyloxy phenyl carbamide; 4-isoamyloxy phenyl carbamide; and 4,4'-diisoamyloxy carbanilide.

The polar groups may be linked to any of the nuclear carbon atoms of the phenyl group. While the compounds usually have the substituents linked to para or ortho carbon atoms because of availability of compounds used to prepare the urea derivatives, those containing meta substituents are equally suitable.

There are also used phenyl derivatives containing different polar groups in the same molecule (asymmetrical compounds) or even in one single phenyl nucleus. Use can also be made of mixtures of isomeric phenyl urea compounds containing polar groups; for example, mixtures of ortho- and para-methoxyphenyl urea or ortho- and para-ethoxyphenyl urea. Such mixtures of isomers often occur as the product of their manufacture owing to the fact that the initial raw materials employed in the process of manufacture is a mixture of isomers, and in such cases, the mixture of isomeric products need not be separated since all isomers are suitable for use as stabilizers. Moreover, mixtures of phenyl urea compounds containing different polar groups are suitable for stabilization use.

The proportion of stabilizing substances used in the composition may be varied considerably. Usually there is employed with the halogen-containing organic material of high molecular weight about an added 0.1% to 2% of the alkaline substance and about an added 0.05% to 3% of the urea compound. While increasing amounts of the alkaline substance result in increasing stability for the composition, such is not the case with respect to the effect of varying proportions of the urea compound. It was quite unexpectedly discovered that upon keeping the percentage of alkaline substance constant and using increasing percentages of the urea compound, a proportion is reached beyond which the stability of the composition is not increased, but rather, begins to decline. In other words, there is an optimum percentage of urea compound which will give the effect of greatest stability. This peculiar effect is evident from the results given in the Table I presented hereinbefore. As shown in the table, the use of 0.45% of either 4-ethoxyphenyl carbamide or N,N'-bis-(4-ethoxyphenyl) urea gives greater stability than use of 0.05% or 1% of either. In many cases, use of about 0.1% to 0.3% of alkaline substance and as little as about 0..1% to 0.3% of the urea compound gives excellent stability.

The compositions of the invention may contain in addition to the halogenated organic material of high molecular weight and the combination of stabilizing substances, any other suitable material desired such as plasticizers like dioctyl phthalate, tricresyl phosphate, chlorinated diphenyl and dibutyl sebacate, colorants, dyes, pigments, fillers, and/or other stabilizers such as naphthyl glycidyl ether, etc. While in general it may be most convenient to incorporate the various materials together on a heated roll mill, other conventional and well known methods may be used. The additives can be added as such, in solution, or in the form of a suspension both during the preparation or processing of the polymers to be stabilized.

The embodiments of the invention in which an exclusive property or privilege is claimed are defined as follows:

1. A composition of matter stabilized against deteriorating effects of heat and light comprising essentially a halogen-containing organic substance having a molecular weight above 2000 in admixture with a stabilizing amount of an alkaline substance and a compound represented by the formula

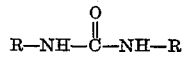

wherein R is a member of the group consisting of hydrogen and phenyl radicals containing nuclear-substituted sulfur-free polar groups, at least one R being said substituted phenyl radical, said polar group being a member of the class consisting of RO—, $NO_2$—, $H_2N$—, halogen—, RHN—, $R_2N$, ROOC—, and RCO— wherein R is a hydrocarbon radical of up to 10 carbon atoms.

2. A composition of matter comprising essentially a polymer of vinyl chloride with molecular weight above 2000 and containing at least 10% chlorine in admixture with 0.1% to 2% of an alkali metal carbonate and 0.05% to 3% of a substituted urea wherein one to two of the amido groups of urea has only a single hydrogen atom thereon replaced by an alkoxyphenyl radical.

3. A composition of matter comprising essentially a polymer of vinyl chloride with molecular weight above 2000 and containing at least 10% chlorine in admixture with 0.1% to 2% of an alkali metal carbonate and 0.05% to 3% of an alkoxyphenyl urea wherein the alkoxyoxy radical contains 1 to 5 carbon atoms.

4. A composition of matter comprising essentially a polymer of vinyl chloride with molecular weight above 2000 and containing at least 10% chlorine in admixture with 0.1% to 2% of an alkali metal carbonate and 0.05% to 3% of N,N'-di(alkoxyphenyl) urea wherein the alkoxy radical contains 1 to 5 carbon atoms.

5. A composition of matter comprising essentially a polymer of vinyl chloride with molecular weight above 2000 and containing at least 10% chlorine in admixture with 0.1% to 2% of an alkali metal carbonate and 0.05% to 3% of nitrophenyl urea.

6. A composition of matter comprising essentially a polymer of vinyl chloride with molecular weight above 2000 and containing at least 10% chlorine in admixture with 0.1% to 2% of an alkali metal carbonate and 0.05% to 3% of para-ethoxyphenyl urea.

7. A composition of matter comprising essentially a polymer of vinyl chloride with molecular weight above 2000 and containing at least 10% chlorine in admixture with 0.1% to 2% of an alkali metal carbonate and 0.05% to 3% of N,N'-di(para-ethoxyphenyl) urea.

8. A composition of matter comprising essentially polyvinyl chloride in intimate admixture with about 0.15% sodium carbonate and about 0.1% to 0.3% of para-ethoxyphenyl urea.

9. A composition of matter comprising essentially polyvinyl chloride in intimate admixture with about 0.15% sodium carbonate and about 0.1% to 0.3% of N,N'-di(para-ethoxyphenyl) urea.

CHRISTIAAN PIETER VAN DIJK.
HEINO TONNIS VOORTHUIS.

REFERENCES CITED

The following references are of record in the file of this patent:

UNITED STATES PATENTS

| Number | Name | Date |
|---|---|---|
| 2,365,400 | Fikentscher | Dec. 19, 1944 |

FOREIGN PATENTS

| Number | Country | Date |
|---|---|---|
| 571,662 | Great Britain | Sept. 4, 1945 |